Nov. 10, 1964     I. L. JOY     3,156,111
METHOD AND APPARATUS FOR USE IN ULTRASONIC RAIL TESTING
Filed Jan. 19, 1959     5 Sheets-Sheet 1

Inventor
Ivan L. Joy.
By Mann, Brown & McWilliams
Attys.

Inventor
Ivan L. Joy
By Mann, Brown & McWilliams,
Attys.

Nov. 10, 1964  I. L. JOY  3,156,111
METHOD AND APPARATUS FOR USE IN ULTRASONIC RAIL TESTING
Filed Jan. 19, 1959  5 Sheets-Sheet 4

Inventor
Ivan L. Joy.
By Mann, Brown & McWilliams
Attys.

Fig. 6.

Inventor
Ivan L. Joy
By Mann, Brown & McWilliams
Attys.

United States Patent Office 3,156,111
Patented Nov. 10, 1964

3,156,111
METHOD AND APPARATUS FOR USE IN
ULTRASONIC RAIL TESTING
Ivan L. Joy, Topeka, Kans., assignor to Chemetron Corporation, Chicago, Ill., a corporation of Delaware
Filed Jan. 19, 1959, Ser. No. 787,618
14 Claims. (Cl. 73—67.9)

This invention relates to an indicating and display system for use in presenting a progressive pictorial representation of a periodic signal pattern such as is produced in the progressive ultrasonic testing of rail by the signal reflection technique.

In ultrasonic rail testing, the monitoring of the reflected signal indications is a difficult task. Various arrangements are known wherein gating techniques are employed for isolating only those signals which are reflected from a particular region selected for test with indication being provided by an alarm bell or light or a pen recorder. With these arrangements, sensitivity and reliability are sacrificed for operator convenience and the intelligence embodied in this type of indication is low.

An alternative form of indication commonly employed in progressive ultrasonic rail testing as well as in numerous other ultrasonic testing applications is the familar "A trace" presentation on the viewing screen of a cathode ray tube. Here again, however, the intelligence of the presentation is of a low order, while operator fatigue becomes a serious problem and prejudices the reliability of the test procedure.

The principal object of the present invention is to provide an indication arrangement that avoids the difficulties of the above-mentioned prior art systems and that provides a display having an intelligence level that is increased manyfold while operator fatigue is correspondingly reduced so that greater sensitivity, reliability, and accuracy are achieved.

In the present invention, a cathode ray tube of a type that produces a long-persistence indication on its viewing screen is employed for producing a B-scan presentation of a periodic set of echo signals so that the indication may be viewed as a readily understandable pictorial representation of the internal structural characteristics of a lengthwise section of a track rail. The persistence and continuity of the display contribute importantly to the accuracy, reliability, and evaluation of the presentation while retaining the sensitivity inherent in a cathode ray type of indicating device. Tests indicate that results superior to those obtainable from direct hand-testing ultrasonic techniques can be achieved in a continuous progressive rail-testing system utilizing the display techniques of this invention. The control circuitry for the display tube is arranged to operate at the time that the display substantially completely spans the viewing screen to apply an erase signal for removing the completed display and to recycle the system to develop a new display for a subsequent rail section.

It will be apparent that the present invention provides a convenient solution to the particular problems involved in presenting an effective indication of the typical set of echo signals that is developed by an ultrasonic system for the progressive testing of rail. The principles of the invention will find important and obvious use in other ultrasonic testing applications, as well as in other fields where a similar set of signals must be displayed for critical examination and analysis.

In the present disclosure, novel arrangements are provided for most effectively presenting the B-scan display. For example, in presenting two separate displays in sequence, an interval of overlap is provided to facilitate the mental transition between displays and thereby provide complete continuity. Erase signals are applied in alternating sequence to remove the display, with one display being erased while the other is being observed.

In a complete ultrasonic rail-testing system, the rails are preferably inspected simultaneously; and in the preferred form of the invention, provision is made for displaying both rails in side-by-side relation on a single viewing screen so that one operator can conveniently monitor the indications from both rails.

Two additional display tubes are provided, one for each rail, for individually presenting an expanded B-scan display of each successive rail-joint and bolt-hole region to permit detailed analysis of the characteristically more complex patterns developed from these regions. Each such joint display tube is periodically controlled to erase its display in time to prepare the tube for the next joint region, with the erase function preferably being controlled by a joint detector for each rail.

Finally a novel technique for monitoring the pattern of a joint display by means of a comparison circuit controlled by television cameras is provided for further improving the sensitivity and reliability of the joint testing while relieving the operator of this particularly difficult phase of the monitoring function.

Other objects and advantages will become apparent during the course of the following description.

In the accompanying drawings forming a part of this specification and in which like numerals are employed to designate like parts throughout the same:

FIG. 6 is a schematic circuit diagram showing an arrangement wherein an ultrasonic machine is connected to a memory tube which is controlled to present expanded displays of the rail-joint and bolt-hole regions and, in addition, FIG. 6 shows a circuit arrangement for using television cameras for reading and comparing the displays on a pair of memory tubes to provide an automatic monitoring of the displays.

In the various embodiments of this invention disclosed herein, novel usage is made of a memory type cathode ray tube indicator in combination with ultrasonic equipment that emits ultrasonic test signal pulses at a predetermined repetition rate to produce a set of echo signals corresponding to each test signal pulse and constituting an A-scan pulse echo signal pattern representative of the internal structural characteristics of a body under test. The ultrasonic machines are progressed along the body so that successive signal reflection patterns correspond to successive sections of the body. These signal patterns are then presented in the form of a B-scan display on the face of the memory tube to provide a pictorial representation of the internal structural characteristics of a lengthwise section of the body.

Figures 1, 1A:
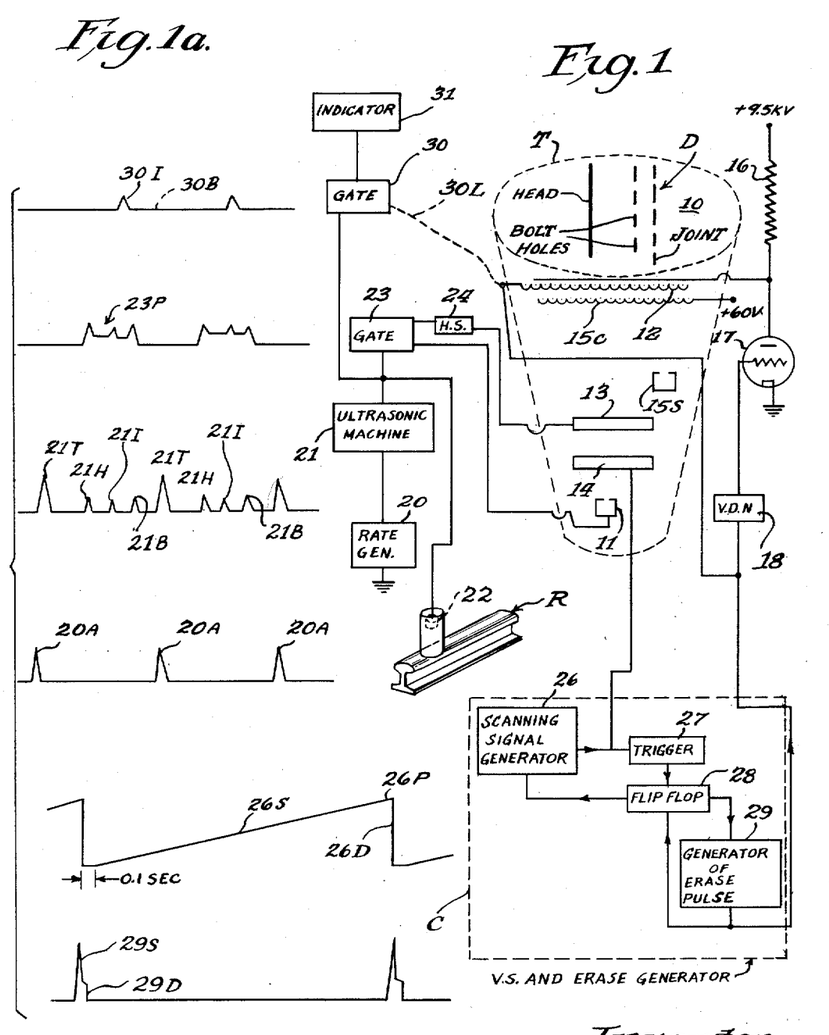
FIG. 1 is a diagrammatic illustration of a simplified ultrasonic testing system that includes a memory tube connected to present a B-scan display in accordance with this invention.
FIG. 1A shows a set of waveforms derived from the ultrasonic testing system of FIG. 1.

The particular memory tube that has been employed in a present constructional embodiment of the invention is made by the Hughes Aircraft Co. under their designation No. 1010 Tonatron, and referring to FIG. 1, it is designated generally as "T" and includes a viewing screen 10, a writing gun 11 emitting radiation to impinge on and illuminate the screen, a storage mesh 12 normally active to cause a persistence of the illumination on the screen, and horizontal and vertical deflection plate systems 13 and 14 that cooperably control the position of radiation from the writing gun. This memory tube also includes a spray gun 15S that is continuously emitting a light spray of radiation that substantially blankets the entire viewing screen and a collimator 15C supplied from a steady 60-volt D.C. source of voltage.

The writing gun 11 is intermittently operated under the control of the signal reflection patterns developed by the ultrasonic testing machines. During the recording or indicating interval of the memory tube, the viewing screen 10 is supplied from a 9.5 kv. source (not shown) through a suitable voltage-dropping resistor 16. The storage mesh 12 is normally operated at a voltage on the order of +3 volts D.C. to cause persistence of illumination on the viewing screen for an extended period of time. An erase pulse having, by way of example, an overall duration on the order of ⅒ of a second, a peak value on the order of +80 volts, and an end value on the order of +20 volts is applied to the storage mesh 12 and a signal of reduced magnitude is simultaneously applied to the grid of a clamping tube 17 through a voltage-dropping network 18 to set up current flow through the clamping tube and draw an appreciable current through the voltage-dropping resistor 16 for dropping the voltage on the viewing screen during the erase pulse interval. This basic control circuitry for the memory tube is employed in substantially identical form throughout all of the various embodiments of the present disclosure for controlling the voltage signals applied to its viewing screen and storage mesh elements.

In FIG. 1, the memory tube T is shown operatively connected to record the set of echo signals produced in a simplified ultrasonic testing system arrangement which is here shown as including a rate generator 20 and an ultrasonic machine 21 controlled by the output pulses of the rate generator for producing periodically recurring sets of echo signals. The rate generator may operate at a repetition rate of 2,000 pulses per second, the output pulses thereof being shown at 20A. The ultrasonic machine is connected to an electromechanical transducer 22 that is shown in elastic wave transmitting and receiving relation with a track rail R through a coupling medium that is preferably in the form of a column of water. Test signals are periodically applied through the transducer to produce reflected signals from the head and base of the rail, such reflected signals being designated as 21H and 21B, respectively. If an internal discontinuity is present in the rail, it will also provide a reflected signal such as is indicated at 21I, and in general the presence of an internal discontinuity will attenuate the strength of the signal reflected from the base of the rail.

The set of signals appearing at the output of the ultrasonic machine 21 is then fed through a main gate section 23 where the transmitted pulse 21T is removed so that only those signals descriptive of the actual rail configuration remain. The resultant periodic sets of echo signals 23P passed by the gate 23 are applied to the control grid of the writing gun 11. A horizontal sweep generator 24 is also controlled from the gate 23 to supply the horizontal deflection plate system 13 in predetermined timed relation with the application of the sets of echo signals to the writing gun.

According to this invention, the equipment is continuously progressed along the rail in a suitable rail vehicle so that the periodic test pulses emitted by the transducer develop periodic sets of echo signals, each set corresponding to a test signal pulse and constituting an A-scan pulse echo signal pattern representative of one of the successive sections of the rail. To present A-scan patterns on the memory tube's viewing screen as a pictorial representation of the internal characteristics of a lengthwise section through the rail, the vertical deflection plate system 14 is supplied from a scanning signal generator 26 having an output wave form as indicated at 26S. Thus, each successive set of echo signals provides a signal reflection pattern that is spaced apart vertically to a slight extent and with the horizontal sweep accurately synchronized with the reflection patterns, a realistic B-scan display, as indicated at D, is produced on the viewing screen 10.

The B-scan display shown on the viewing screen 10 in the FIG. 1 arrangement illustrates the type of presentation that is obtained at a joint and bolt hole region of a track rail, and the indications corresponding to the head, base, and bolt holes are clearly labelled. It will be understood that the display is progressively developed over a period of time determined by the slope of the scanning signals 26S and that during this time, the transducer 22 is progressed along the rail so that the display represents a lengthwise section of the rail.

As mentioned previously, an erase pulse is periodically applied to the memory tube to wipe out each display substantially as it occupies the entire height of the viewing screen, and this prepares the tube for successively developing corresponding displays of progressive sections of rail. Thus, the erase pulse acts in timed relation with the vertical scanning signal and it is therefore preferably initiated in response to the scanning signal itself.

In the preferred arrangement, the output of the scanning signal generator 26 is sampled by a trigger circuit 27 that is set to respond when the scanning signal reaches a predetermined value. The trigger circuit, in turn, actuates a "flip-flop" circuit 28 which is connected to an erase pulse generator 29. The flip-flop circuit 28 is also connected to the scanning signal generator to feed back a signal for turning off the scanning signal generator. Finally, the erase pulse generator 29 feeds back a signal to the flip-flop circuit 28 to control it for feeding back another signal to the scanning signal generator 26 to turn it on and initiate a subsequent scanning signal.

Reference may be had to the wave forms for better understanding the operation of this circuit. When the scanning signal 26S reaches the point 26P, the trigger circuit 27, through the flip-flop circuit 28, turns off the scanning signal generator, with the scanning signal undergoing a sharp descension as indicated at 26D. The erase pulse generator produces a sharply peaked wave 29S that has a square trailing edge and a corresponding sharp descension, as indicated at 29D. This sharp descension at the trailing edge of the erase pulse actuates the flip-flop to again turn on the generator after the "off" period that corresponds generally to the time interval of the erase pulse. This "off" period may be on the order of ⅒ of a second.

Thus, the vertical scanning signal 26S and the erase pulse 29S are applied to the memory tube in a definite and predetermined timing relationship, with the erase pulse appearing during the intervals between the scanning signals. As described previously, the erase pulse controls the viewing screen 10 and storage mesh 12 simultaneously.

It will be apparent that with the FIG. 1 arrangement, flaws that are traversed during the erase intervals will not be recorded on the viewing screen, and provision is made for separately monitoring the output of the ultrasonic machine to detect flaws occurring during these erase intervals. One simplified arrangement which is illustrated herein is the use of an auxiliary gate 30 connected to the output of the ultrasonic machine and arranged to gate out the test signal and also the signals corresponding to reflections from the head and base of the rail so that only those signals 30I reflected from internal discontinuities pass the gate 30 and operate a suitable indicator 31 which may be in the form of a cathode ray tube, a chronograph tape, a bell, a light, or some similar device. Alternatively, the gate 30 may be arranged to gate out all signals except that corresponding to the reflection from the base of the rail, as indicated in dotted lines at 30B, and the indicator 31 would then be held unresponsive by the presence of the base echo signal and would indicate only upon the absence of this signal. This so-called "base echo" system has been effectively employed in ultrasonic rail testing and offers the advantages of a "fail-safe" method of operation.

While in the FIG. 1 arrangement the gate 30 is shown as being completely independent in its operation from the erase signal circuitry, it will be understood that the auxiliary gate circuit is required only for bridging the actual erase intervals and hence, if desired, the gate may be connected to and controlled by the erase circuitry so that it is effective only during the actual erase intervals. A dotted control line for this purpose is shown at 30L.

It will also be apparent that the duration of the scanning signals and the speed at which the equipment is progressed along the rail is not critical to the essential functioning of the display equipment. In some instances, it may be desired, however, to correlate the timing of the equipment so that the erase intervals never occur in the vicinity of the rail-joint and bolt-hole regions. This can readily be accomplished by controlling the initiation of the scanning signal by a joint-responsive rail coil or other suitable device. Such an adaptation will become more clear in the light of the explanation which is made hereinafter in connection with FIG. 6.

For simplicity, the arrangement of FIG. 1 is confined to a showing of a circuit for displaying a pictorial representation of a single track rail. However, for operator convenience and for minimizing the required number of memory tubes, it is preferred to display representations of both rails simultaneously in side-by-side relation on a single viewing screen, and FIG. 2 illustrates a convenient, simplified circuit arrangement for achieving this result.

Figures 2, 4:
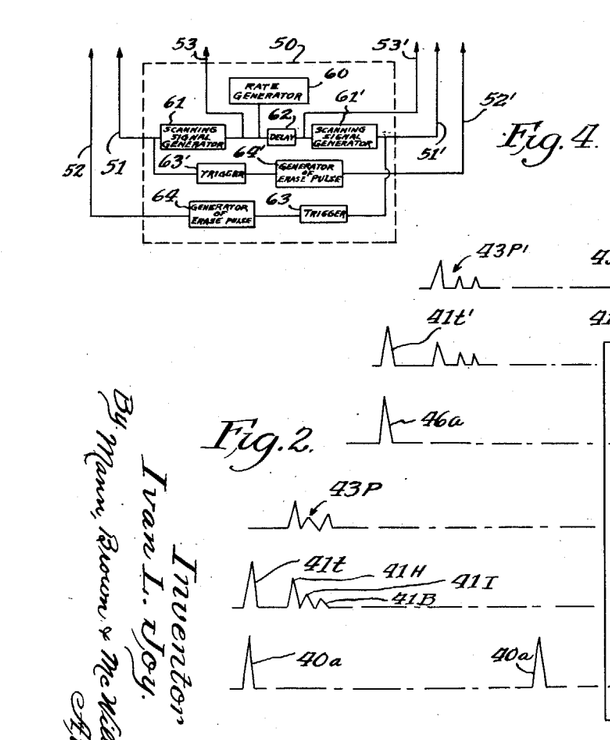
FIG. 2 is a simplified schematic diagram of an ultrasonic testing system wherein a pair of ultrasonic machines simultaneously and progressively test a pair of track rails and includes a memory tube arrangement connected to both machines for simultaneously presenting B-scan displays for the rails in side-by-side relation.
FIG. 4 is a simplified block diagram of one arrangement of a control circuit arrangement for use in the circuit of FIG. 3 for producing the signals shown in FIG. 3A.

In FIG. 2, a pair of ultrasonic machines 41 and 41' are shown, with one machine having its transducer 42 coupled to rail R and the other machine having its transducer 42' coupled to rail R'. A single memory tube T is employed, and the circuitry for generating the vertical scanning signals and erase voltage pulses may be identical with that of FIG. 1 and is indicated generally at C in operative connection with the appropriate elements of the memory tube.

The ultrasonic machines are preferably synchronized in their operation and are controlled from a single rate generator 40 which is directly connected to one of the ultrasonic machines 41 and which is connected through a delay network 46 to the other ultrasonic machine 41'. The ultrasonic machines are each provided with gate sections 43 and 43' for gating out the transmitted signals 41T and 41T', and the outputs 43P and 43P' of both gates are connected to the writing gun 11 of the memory tube so that the successive sets of echo signals from the ultrasonic machine are presented to the writing gun in alternating sequence.

The repetition rate of the rate generator 40 is selected so that the interval between its successive output pulses 40A is more than twice the time interval of one set of echo signals such as 43P. This permits the patterns from the ultrasonic machines to appear in side-by-side, non-overlapping relationship on the viewing screen. The horizontal deflection plate system 13 of the memory tube is supplied with signals from a horizontal sweep generator 44 under the control of gate section 43 to operate at a repetition rate corresponding to that of the rate generator 40. In addition, the horizontal sweep generator must have a sweep interval having a duration at least twice the duration interval of a single set of echo signals.

In summary, the functioning of this circuit arrangement is as follows: The output pulses 40A from the rate generator 40 periodically actuate the ultrasonic machine 41 and it periodically produces an output wave form having a test signal 41T and reflection signals 41H, 41I, and 41B from the head, interior and base, respectively, of its rail. The output from the ultrasonic machine 41 is applied to the gate 43 to separate the signal reflection pattern 43P for direct presentation to the writing gun 11.

In the meantime, the output from the rate generator appears at the output of the delay, as indicated at 46A after the end of the set of echo signals 43P from the first ultrasonic machine. This delayed signal then sets the second ultrasonic machine 41' into operation to produce a set of echo signals 43P' at the output of its gate 43'. Thus, these two sets of echo signals are applied in alternating sequence to control radiation from the writing gun 11. This radiation pattern is spread out horizontally on the viewing screen under the influence of the horizontal deflection plate system which is supplied with sweep signals that are initiated in timed relation with the sets of echo signals, with the sweep signals having the same repetition rate as the output pulses of the rate generator.

The display appearing on the viewing screen of the memory tube in FIG. 2 is clearly labelled to show that both rails are presented simultaneously in side-by-side relationship, and this convenient arrangement of the display permits a single operator to monitor both of them with ease and also conserves on the number of memory tubes required for the rail-testing operations.

It will be apparent that the basic circuit of FIG. 2 may be extended to include an auxiliary gate and indicator for each rail after the manner illustrated in connection with FIG. 1; but for simplicity of disclosure, this arrangement is not repeated.

Figure 3:
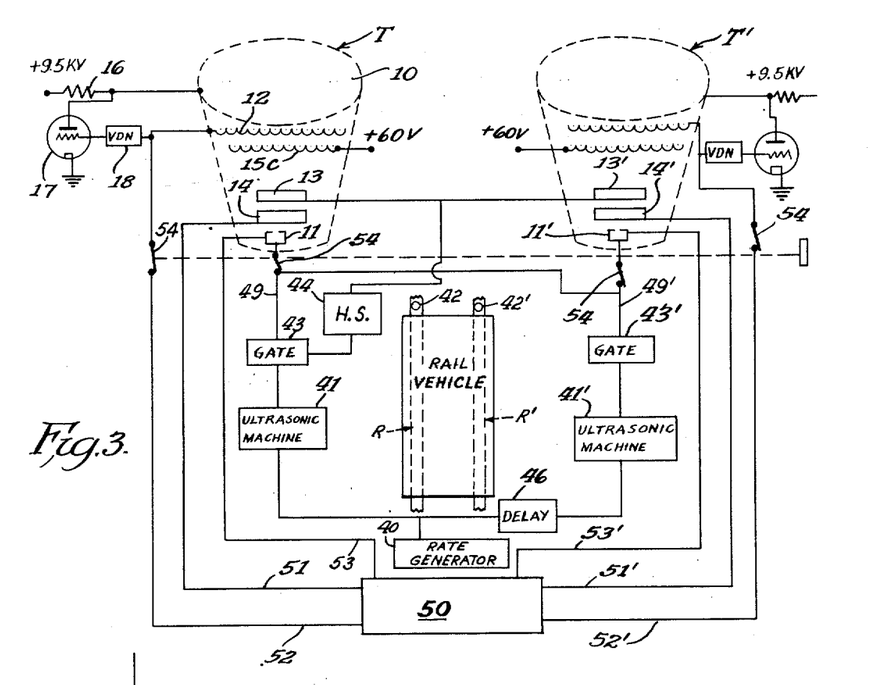
FIG. 3 is a generalized circuit diagram of an ultrasonic testing system wherein a pair of ultrasonic machines, each of which may be associated with a track rail, are connected to feed a pair of memory tubes to provide a continuous presentation of the internal condition of the track rails by alternating from one memory tube to the other.

A memory tube arrangement for providing a continuous B-scan display of the successive sections of rail has been employed in a preferred constructional embodiment of the invention, and this is illustrated in simplified form in FIG. 3 wherein each one of a pair of memory tubes T and T' periodically produces a B-scan display, with the displays of one tube occurring in alternating sequence with the displays of the other tube. In this arrangement, the display for each tube bridges the gap required for erasing the other tube. Each tube is connected so that it will display both rails simultaneously in the manner described in connection with FIG. 2 and corresponding equipment in the FIG. 2 and FIG. 3 arrangements is identically numbered.

Figure 5:
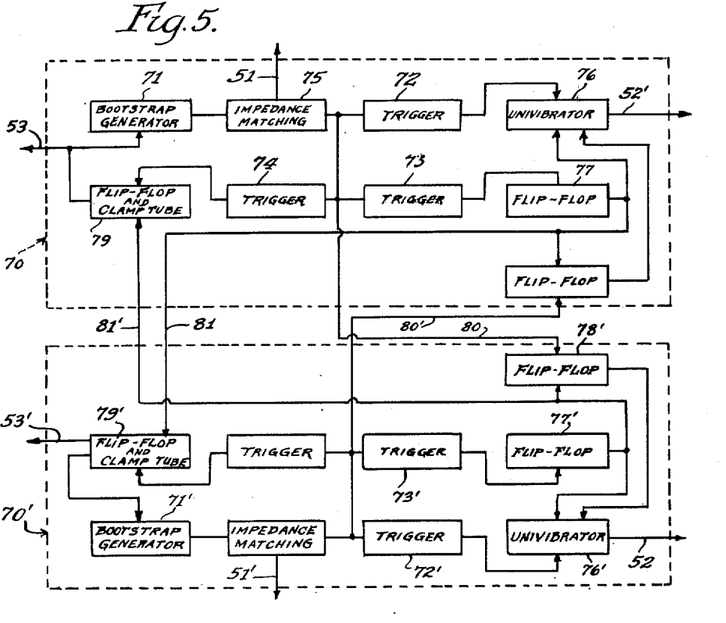
FIG. 5 is a simplified block diagram of another control circuit arrangement for use in the circuit of FIG. 3 for producing the signals shown in FIG. 3A.

The sequencing of the displays on the two memory tubes is determined by the control signals applied to the vertical deflection plate systems and the erase systems of these tubes. In FIG. 3, a control box for supplying these signals to the memory tubes in proper sequence and with proper timing relationships is designated generally at 50 and is shown connected through leads 51, 52, 53, 51', 52', and 53' to control the memory tubes. Two different forms for this control box are shown in FIGS. 4 and 5, and before describing these specific arrangements for controlling the sequencing of the displays, it is preferred to make clear the nature of the sequencing signals which they produce and the timing relationships that exist.

Figure 3A:
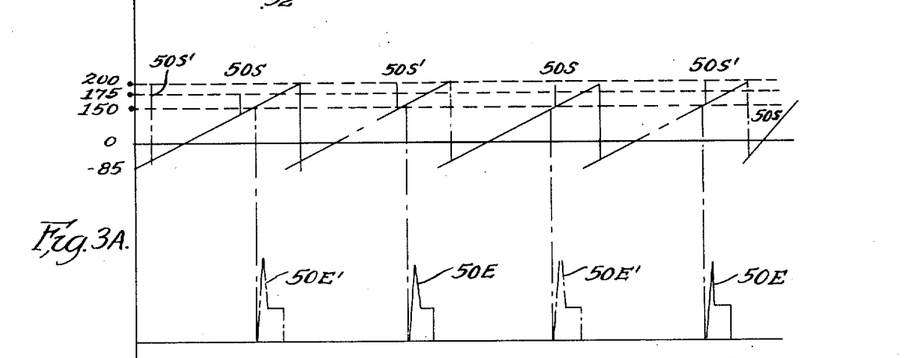
FIG. 3A is a diagram of the scanning signals and erase pulses that are applied to the memory tubes to cause them to alternately present the B-scan displays.

To assure continuity and to facilitate transition on the part of the operator from one display to the other, it is preferred that each display overlap to some extent and end with the preceding and following displays, respectively. Since the displays are alternately provided by one tube and then the other, the scanning signals applied to the vertical deflection plate systems of the two tubes must alternate in timed relation from one tube to the other and each scanning signal must overlap in time with the preceding and following scanning signal. This is illustrated in FIG. 3A wherein the scanning signals for memory tube T are designated 50S while the scanning signals for memory tube T' are designated 50S'. Since the reflected signal patterns and horizontal sweep signals are identically applied to both memory tubes, the last part of a display that has been developed on memory tube T will correspond identically with the first part of the display that is being developed on memory tube T'. The completed display on one tube may be retained while the display on the other tube is developed. Therefore, an erase signal is applied to wipe out an existing display on a tube only immediately prior to the time at which the next display is to be developed on that tube, and this timing of the erase pulses is also indicated in FIG. 3A. The erase pulses 50E for memory tube T are applied towards the end of the scanning interval for tube T'. Similarly, the erase pulses 50E' for memory tube T' are applied towards the end of the scanning interval for memory tube T.

Provision is preferably made for holding the displays in fixed position to permit of detailed analysis whenever desired. Accordingly, ganged switches 54 are interposed in lines 49, 49', 52, and 52' to turn off the control signals for the memory tubes which then retain their instant luminescent patterns for as much as thirty minutes.

In FIG. 4, a simplified circuit arrangement is disclosed for producing the pattern of scanning signals and erase pulses shown in FIG. 3A. This circuit is controlled by a rate generator 60 having a repetition rate preferably many times smaller than the repetition rate of the ultrasonic machines. The rate generator 60 actuates separate scanning signal generators 61 and 61' for supplying scanning signals 50S and 50S' to the vertical deflection plate systems of the memory tubes in alternating sequence, an adjustable delay network 62 being employed for setting the proper time sequence of the two scanning signals. The actuating signals for the scanning signal generators are also supplied to the grids of the writing guns 11 and 11' over lines 53 and 53' to turn on the writing guns for each scanning interval. The output from the scanning signal generator 61 for memory tube T is also connected to a trigger circuit 63' that responds at a predetermined signal value for actuating an erase pulse generator 64 for memory tube T'.

In FIG. 5 there is shown a self-cycling sequencing circuit which ensures that the various control signals of FIG. 3A will be generated and applied to the equipment in proper sequence. In this arrangement this self-cycling circuit is comprised of identical upper and lower sections 70 and 70' that are suitably interconnected so that the operation of the upper section is dependent upon the prior operation of the lower section and vice versa.

Each section includes a boot strap sweep generator 71 for producing scanning signals that sweep linearly from −85 volts to +200 volts; a number of trigger circuits 72, 73 and 74 responsive, respectively, when the scanning signal voltage value reaches 150 volts, 175 volts, and 200 volts; an impedance-matching circuit 75, preferably in the form of a double cathode follower, and connecting the output of generator 71 to the trigger circuits for maintaining desired linearity; a univibrator circuit 76 controlled from trigger circuit 72, a pair of flip-flop circuits 77 and 78 controlled from trigger circuit 73; and finally, a flip-flop and clamp tube circuit 79 controlled from trigger circuit 74.

In more detail, univibrator circuit 76 generates an erase signal when it is initiated by the action of trigger circuit 72 to send out an erase pulse over line 52' to control the erase section of memory tube T' of FIG. 3. Trigger circuit 73 then initiates flip-flop circuit 77 for restoring or turning off the erase univibrator 76 to terminate the erase pulse. The restoring flip-flop 77 also initiates locking flip-flop 78 which then holds erase univibrator 76 inactive until the locking flip-flop 78 releases in response to voltage output of the boot strap generator 71' of the other section to which it is connected by line 80'. Trigger circuit 74 initiates a flip-flop and clamp tube circuit 79 for turning off the boot strap generator 71 at the appropriate time, and it is held off until the flip-flop and clamp tube circuit 79 is restored by a signal supplied from the restoring flip-flop 77' of the other section through connection line 81'. It will be apparent from a consideration of FIG. 5 that the two sections are identical in arrangement, operation and interconnection so that the circuit cycles back and forth continuously to develop control signals in proper sequence in accordance with the patterns shown in FIG. 3A.

The operating sequence of the self-cycling circuit of FIG. 5 will be described assuming that boot strap sweep generator 71 for supplying the vertical deflection plate system of memory tube T over line 51 is ready to begin its sweep, at which time the erase univibrator 76 is in condition for actuation by trigger circuit 72. It will be recalled that the boot strap sweep generator 71 is initiated by a signal applied simultaneously to the grid of writing gun 11 over line 53 and to the flip-flop and clamp tube circuit 79 over line 81' and it then produces a preferably linear scanning signal that varies from −85 volts to +200 volts. As the scanning signal 50S reaches a value of approximately 50 volts, the voltage on connection line 80 restores the locking flip-flop 78' of the lower section. Erase univibrator 76' is thereby released to prepare it for subsequent actuation by trigger circuit 72'.

As the scanning signal reaches a value of 150 volts (see FIG. 3A), trigger 72 responds and actuates erase univibrator 76 to apply an erase signal 50E' to memory tube T'. As the scanning signal reaches a value of 175 volts, trigger circuit 73 responds and actuates restoring flip-flop 77 to turn off the erase pulse and also actuates the locking flip-flop 78 to hold the erase univibrator 76 off. In addition, the restoring flip-flop 77, over a connection line 81, unlocks the flip-flop and clamp tube circuit 79' of the lower section to turn on the boot strap generator 71' of the lower section. Thus, as boot strap generator 71 sweeps through 175 volts, boot strap generator 71' is initiated. As boot strap generator 71 reaches 200 volts, trigger circuit 74 responds and actuates flip-flop and clamp tube circuit 79 to turn off boot strap generator 71.

The lower circuit section undergoes a similar sequence of operations, it being noted that line 80' applies a signal from the lower section to release the locking flip-flop 78 and thereby unlock the erase univibrator 76. This cycling sequence continuously repeats itself.

Figure 6:
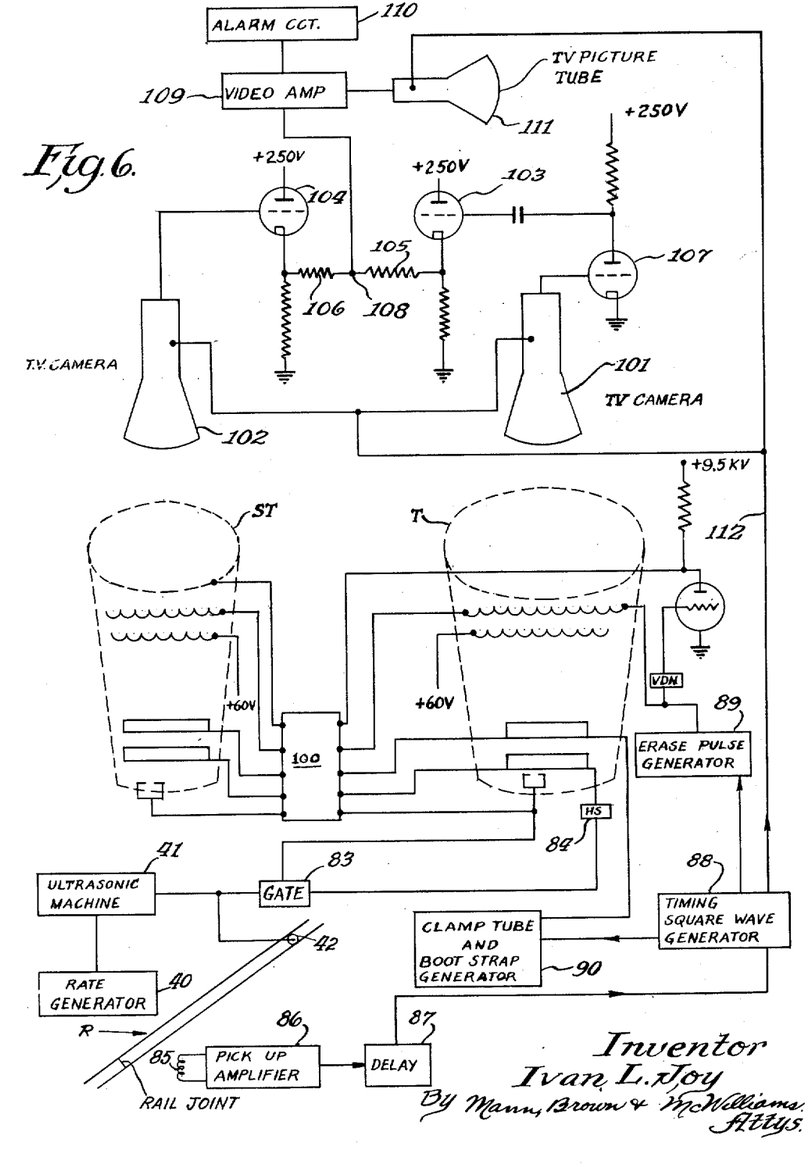

In ultrasonic rail testing employing memory tubes, the displays developed at the rail-joint and bolt-hole regions may become quite detailed, and there is advantage in providing an expanded display of the rail-joint and bolt-hole region. According to the present invention, in addition to the two memory tubes shown in the FIG. 3 arrangement for continuously displaying the successive sections of rail, it is contemplated that two additional memory tubes will be employed, one for each rail, with each of these additional tubes providing an expanded display of each successive rail joint region. A typical control circuit arrangement for one of these joint display memory tubes is shown in FIG. 6 wherein the memory tube is again designated "T." It is to be understood that in FIG. 6 a joint display tube for only one rail is shown and that a corresponding arrangement would be employed in connection with the other rail.

The memory tube is shown in connection with the usual rate generator 40, ultrasonic machine 41, gate section 83, and horizontal sweep generator 84; and the operation and connection of these components will now be apparent. In this instance, the vertical scanning circuit is to be active only at the rail-joint and bolt-hole regions and it will be triggered as each joint is approached, by a suitable joint-responsive detecting device. In this disclosure a rail coil 85 is shown for this purpose, and it may be mounted on the detector car to sense the presence of a joint as it is approached and turn on the vertical scanning equipment. Obviously, other forms of detecting devices may be employed for sensing the rail joints, such, for example, as a mechanical feeler or an ultrasonic channel. In any event, the rail coil or other joint-detecting device may operate an amplifier 86 and, through a delay circuit 87 and timing square wave generator 88 controlled in accordance with the relative positioning of the joint detector and the ultrasonic gear and in accordance with the speed of the detector car, the proper scanning signal and erase pulse pattern is provided. On the one hand the timing square wave generator 88 feeds an erase pulse generator 89 for applying erase pulses to the memory tube, and on the other hand it feeds a clamp tube and boot strap generator 90 for applying vertical scanning signals to the memory tube. The scanning signals in this instance will be faster relative to the scanning signals employed in the previous embodiments in order to provide an expanded display of the rail joint region.

The operation of this memory tube arrangement is believed to be self-evident. It should be noted, however, that the gate 83 shown in FIG. 6 can be connected to the output of ultrasonic machine 41 of FIG. 3 for incorporating the FIG. 6 arrangement bodily into the FIG. 3 arrangement. Similarly, another joint display memory tube and rail coil-controlled circuit can be connected to the output of ultrasonic machine 41' in FIG. 3 to provide a composite arrangement wherein two memory tubes operate in sequence for continuously displaying progressive sections of the track rails and two additional memory tubes provide expanded displays of the successive rail joints in each rail. This four-tube arrangement is employed in a present rail-testing installation constructed in accordance with this invention.

The arrangements described thus far provide displays that greatly increase the intelligence level in recording the sets of echo signals provided by the ultrasonic machines, and the continuity of the presentation minimizes operator fatigue. However, a system for automatically monitoring the B-scan displays is provided in order to further enhance the potential of progressive ultrasonic rail flaw testing. Such automatic monitoring is most useful in connection with the rail-joint and bolt-hole region displays and is illustrated in this connection in FIG. 6. In providing automatic monitoring, a comparision technique is employed utilizing a pair of television cameras, the outputs of whch are fed to a balancing network with the degree or extent of unbalance therein being applied to an indicator or alarm. As mentioned previously, memory tube T of FIG. 6 provides an individual display of each successive rail-joint and bolt-hole pattern. Memory tube ST is provided to receive and store a standard pattern of a rail-joint and bolt-hole region that is free of difficulties. A typical flaw-free joint area may be selected for the development of the standard pattern, and a control box is shown at 100 to permit memory tube ST to be connected to the control circuitry of memory tube T for creating the standard display pattern. Alternatively, an appropriate set of echo signals for producing the desired standard display pattern could be stored on magnetic tape or other suitable memory device for periodically renewing the illumination on memory tube ST. In either case, a standard display pattern is maintained on memory tube ST for comparision with each successive display pattern that is presented on memory tube T.

Television camera 101 is focused on the viewing screen of memory tube T, while television camera 102 is focused on the viewing screen of memory tube ST. If the pattern appearing on both memory tubes is identical in size and shape, the outputs from the television cameras are cancelled out and no indication will appear.

The balancing network for the outputs of camera tubes 101 and 102 includes a pair of cathode followers 103 and 104, the cathodes of which are bridged by series-connected resistors 105 and 106 of equal impedance. The output signals from television camera 101 is passed through an inverter stage 107 and then fed to cathode follower 103 at opposite polarity to the signals applied to cathode follower 104. The voltages at the output of the cathode followers thus divide across the resistors 105 and 106 so that when the outputs from the camera tubes are equal, zero voltage appears at point 108, which is connected to a video amplifier 109 that feeds a suitable alarm circuit 110 and a television picture tube 111. The sweep circuits for television cameras 101 and 102 and for the television picture tube 111 are tied together and are initiated simultaneously from a control line 112 fed by the timing square wave generator 88 to provide solid synchronization at all times.

When two patterns are in exact correspondence such that their outputs are equal and the voltage at point 108 remains zero, a blank picture appears on the tube 111. When the outputs are unequal by reason of one pattern having a spot not found in the other pattern, the spot is reproduced on the picture tube 111.

The picture tube 111 facilitates the initial alignment of this equipment and when the components are in proper position to achieve perfect balance, a blank picture will appear on tube 111. Various adjustments and refinements may be made in the matching circuitry, as required. For example, multi-vibrators and delay circuits can be used with gating circuits of the type employed in the ultrasonic gear mentioned hereinbefore to admit or omit any desired portions of the outputs from the television cameras. Similarly, masking of the patterns can be used to advantages to make the observed patterns less complicated.

The sensitivity of the comparison equipment far exceeds human perception, and in some instances it may be desirable to cut down on sensitivity. This may be done by changing the electronic focus of the television cameras so that their beams are not as sharp. In addition, the required number of sweeps for actuating the indicator may also be controlled to lessen the sensitivity of the equipment. A resistor and diode may be bypassed between the video amplifier 109 and the alarm circuit 110 to produce an averaging circuit that is adjustable to respond only when a desired number of sweeps indicate a lack of conformity between the patterns being compared.

The monitoring equipment itself may find important application in fields other than ultrasonic rail testing. For example, this equipment could be used to compare money or colors. It may compare one known object against an unknown object or it may compare an unknown object against a picture of a known object.

Figure 7:
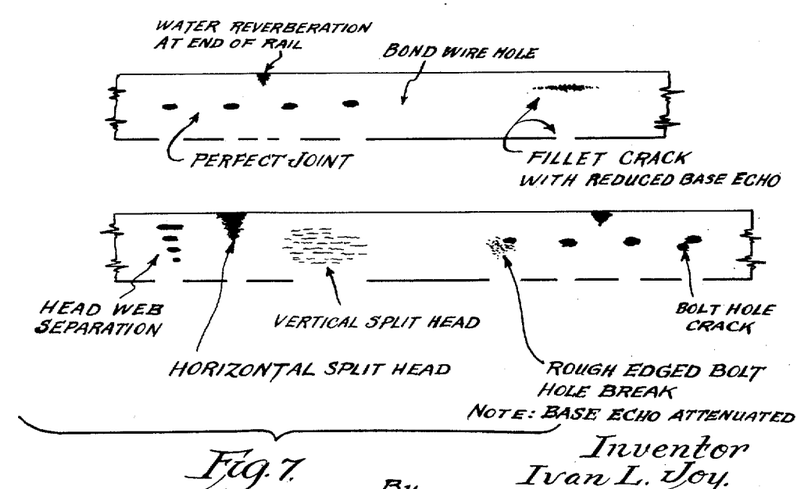
FIG. 7 illustrates the characteristic appearance of certain types of internal discontinuities in rails when presented as a B-scan display on a memory tube in accordance with the present invention.

In order to best describe the importance and the advantages of the B-scan display that is provided on cathode ray type memory tubes in accordance with this invention, a set of characteristic patterns that are produced in a progressive rail-testing operation are shown in FIG. 7.

It should be understood that the description of the preferred form of the invention is for the purpose of complying with Section 112, Title 35, of the U.S. Code and that the claims should be construed as broadly as prior art will permit.

I claim:

1. Apparatus for providing a progressive pictorial representation of the internal structural characteristics of lengthwise successive portions of a track rail and comprising ultrasonic equipment including means for emitting successive ultrasonic test signal pulses at a predetermined repetition rate and for receiving echoes of said pulses, means for progressing the ultrasonic equipment along the rail to successively establish such equipment in elastic wave transmitting and receiving relation with lengthwise successive portions of the rail to enable such ultrasonic equipment to produce a set of echo signals corresponding to each said test signal pulse and constituting an A-scan pulse echo signal pattern representative of lengthwise successive sections of the rail, a memory type cathode ray tube having a fluorescent screen, means for projecting a beam of cathode rays on to said screen and means for deflecting said beam in two coordinate directions, two coordinate scanning means for said tube and including first means operable at said repetition rate and at a certain scan speed for repeatedly deflecting said beam along one coordinate direction for a certain scan time, second means operable at a repetition rate and scan speed many times lower than the first named repetition rate and scan speed for repeatedly deflecting said beam along another coordinate direction for a scan time many times greater than the first named scan time, means for varying the intensity of the beam in accordance with the intensity of the said sets of echo signals received by said receiving means, and means operable by said second means for applying an erase signal to said tube in synchronized relation with said second means to erase stored trace intelligence from said screen prior to application of new trace intelligence.

2. Apparatus for providing a progressive pictorial representation of the internal structural characteristics of lengthwise successive portions of a track rail and comprising ultrasonic equipment including means for emitting successive ultrasonic test signal pulses at a predetermined repetition rate and for receiving echoes of said pulses, means for progressing the ultrasonic equipment along the rail to successively establish such equipment in elastic wave transmitting and receiving relation with lengthwise successive portions of the rail to enable such ultrasonic equipment to produce a set of echo signals corresponding to each said test signal pulse and constituting an A-scan pulse echo signal pattern representative of lengthwise successive sections of the rail, a memory type cathode ray tube having a fluorescent screen, means for projecting a beam of cathode rays on to said screen and means for deflecting said beam in two coordinate directions, two coordinate scanning means for said tube and including first means operable at said repetition rate and at a certain scan speed for repeatedly deflecting said beam along one coordinate direction for a certain scan time, a scanning signal generator operating at a repetition rate and scan speed many times lower than the first named repetition rate and scan speed and connected for deflecting said beam along another coordinate direction for a scan time many times greater than the first named scan time, an erase signal generator connected to apply an erase signal to said tube to remove stored trace intelligence from said screen, and means connecting said erase signal generator to operate in synchronized relation to said scanning signal generator to erase stored trace intelligence from said screen prior to application of new trace intelligence.

3. Apparatus for providing a progressive pictorial representation of the internal structural characteristics of lengthwise successive portions of a track rail and comprising ultrasonic equipment including means for emitting successive ultrasonic test signal pulses at a predetermined repetition rate and for receiving echoes of said pulses, means for progressing the ultrasonic equipment along the rail to successively establish such equipment in elastic wave transmitting and receiving relation with lengthwise successive portions of the rail to enable such ultrasonic equipment to produce a set of echo signals corresponding to each said test signal pulse and constituting an A-scan pulse echo signal pattern representative of lengthwise successive sections of the rail, a memory type cathode ray tube having a fluorescent screen, means for projecting a beam of cathode rays on to said screen and means for deflecting said beam in two coordinate directions, scanning means for said tube and including first means operable at said repetition rate and at a certain scan speed for repeatedly deflecting said beam along one coordinate direction for a certain scan time, second means operable independently of the relative speed between the ultrasonic equipment and the rail and operable at a repetition rate and scan speed many times lower than the first named repetition rate and scan speed for repeatedly deflecting the beam along another coordinate direction for a scan time many times greater than the first named scan time, means for varying the intensity of the beam in accordance with the intensity of the said sets of echo signals received by said receiving means, and means operable by said second means for applying an erase signal to said tube in synchronized relation to said second means to erase stored trace intelligence from said screen prior to application of new trace intelligence.

4. Apparatus for continuously and progressively displaying an integrated pictorial representation of successive sets of signals, said sets occurring at a predetermined repetition rate and comprising means for receiving said sets of signals, first and second memory type cathode ray tubes, each tube having a fluorescent screen, means for each tube for projecting a beam of cathode rays onto its screen, and means for each tube for deflecting its beam in two coordinate directions, cyclical means connected to each tube and operable at said repetition rate and at a certain scan speed for deflecting its beam in one coordinate direction for a certain scan time, scanning means connected to the first tube for deflecting its beam in the other coordinate direction for a scan time many times greater than the first named scan time, scanning means connected to the second tube for deflecting its beam in the other coordinate direction for a scan time many times greater than the first named scan time, sequencing means actuating said scanning means of said tubes at a repetition rate many times lower than the first named repetition rate and in an alternating sequence to cause the beam of said first tube to scan its screen during intervals between successive scannings of the screen of the second tube by its beam and correspondingly to cause the beam of said second tube to scan its screen during intervals between successive scannings of the screen of said first tube, means for varying the intensity of each beam in accordance with the intensity of the sets of signals received by said receiving means, and means synchronized with said sequencing means for applying erase signals in an alternating sequence to said tubes to erase stored trace intelligence from each screen individually and prior to application of new trace intelligence.

5. Apparatus for continuously and progressively displaying an integrated pictorial representation of successive sets of signals, said sets occurring at a predetermined repetition rate and comprising means for receiving said sets of signals, first and second memory type cathode ray tubes, each tube having a fluorescent screen, means for each tube for projecting a beam of cathode rays onto its screen, and means for each tube for deflecting its beam in two coordinate directions, cyclical means connected to each tube and operable at said repetition rate and at a certain scan speed for deflecting its beam in one coordinate direction for a certain scan time scanning means connected to the first tube for deflecting its beam in the other coordinate direction for a scan time many times greater than the first named scan time, scanning means connected to the second tube for deflecting its beam in the other coordinate direction for a scan time many times greater than the first named scan time, sequencing means actuating said scanning means of said tubes at a repetition rate many times lower than said predetermined rate and in an alternating overlapping sequence to cause the beam of said first tube to scan central regions of its screen during intervals between successive scannings of the screen of the second tube by its beam and correspondingly to cause the beam of said second tube to scan central regions of its screen during intervals between successive scannings of the screen of said first tube, means for varying the intensity of each beam in accordance with the intensity of the sets of signals received by said receiving means, and means synchronized with said sequencing means for applying erase signals in an alternating sequence to said tubes to erase stored trace intelligence from said screen prior to application of new trace intelligence.

6. Apparatus for providing a progressive pictorial representation of the internal structural characteristics of lengthwise successive portions of a track rail and comprising ultrasonic equipment including means for emitting successive ultrasonic test signal pulses at a predetermined repetition rate and for receiving echoes of said pulses, means for progressing the ultrasonic equipment along the rail to successively establish such equipment in elastic wave transmitting and receiving relation with lengthwise successive portions of the rail to enable such equipment to produce a set of echo signals corresponding to each test signal pulse and constituting an A-scan pulse echo signal pattern representative of lengthwise successive sections of the rail, first and second memory type cathode ray tubes, each tube having a fluorescent screen, means for each tube for projecting a beam of cathode rays onto its screen, and means for each tube for deflecting its beam in two coordinate directions, cyclical means connected to each tube and operable at said repetition rate and at a certain scan speed for deflecting its beam in one coordinate direction for a certain scan time, scanning means connected to the first tube for deflecting its beam in the other coordinate direction for a scan time many times greater than the first named scan time, scanning means connected to the second tube for deflecting its beam in the other coordinate direction for a scan time many times greater than the first named scan time, sequencing means actuating said scanning means of said tubes at a repetition rate many times lower than the first named repetition rate and in an alternating sequence to cause the beam of said first tube to scan its screen during intervals between successive scannings of the screen of the second tube by its beam and correspondingly to cause the beam of said second tube to scan its screen during intervals between successive scannings of the screen of said first tube, means for varying the intensity of each beam in accordance with the intensity of the said sets of echo signals received by said receiving means, and means synchronized with said sequencing means for applying erase signals in an alternating sequence to said tubes to erase stored trace intelligence from each screen individually and prior to application of new trace intelligence.

7. Apparatus for providing a progressive pictorial representation of the internal structural characteristics of lengthwise successive portions of a track rail and comprising ultrasonic equipment including means for emitting successive ultrasonic test signal pulses at a predetermined repetition rate and for receiving echoes of said pulses, means for progressing the ultrasonic equipment along the rail to successively establish such equipment in elastic wave transmitting and receiving relation with lengthwise successive portions of the rail to enable such equipment to produce a set of echo signals corresponding to each test signal pulse and constituting an A-scan pulse echo signal pattern representative of lengthwise successive sections of the rail, means for receiving said sets of signals from said equipment, first and second memory type cathode ray tubes, each tube having a fluorescent screen, means for each tube for projecting a beam of cathode rays onto its screen, and means for each tube for deflecting its beam in two coordinate directions, cyclical means connected to each tube and operable at said repetition rate and at a certain scan speed for deflecting its beam in one coordinate direction for a certain scan time, scanning means connected to the first tube for deflecting its beam in the other coordinate direction for a scan time many times greater than the first named scan time, scanning means connected to the second tube for deflecting its beam in the other coordinate direction for a scan time many times greater than the first named scan time, sequencing means actuating said scanning means of said tubes at a repetition rate many times lower than said predetermined rate and in an alternating overlapping sequence to cause the beam of said first tube to scan central regions of its screen during intervals between successive scannings of the screen of the second tube by its beam and correspondingly to cause the beam of said second tube to scan central regions of its screen during intervals between successive scannings of the screen of said first tube, means for varying the intensity of each beam in accordance with the intensity of the sets of echo signals received by said receiving means, and means synchronized with said sequencing means for applying erase signals in an alternating sequence to said tubes to erase stored trace intelligence from said screen prior to application of new trace intelligence.

8. Apparatus for simultaneously displaying a progressive, side-by-side pictorial representation of two separate groups of signals, each group comprising successive sets of signals, each group having its successive sets occurring at an identical repetition rate that define a determinable time period wherein each set of each group has an actual time length substantially less than said time period and wherein the total of the time length for any set of one group and the time length for any set of the other group is not greater than said determinable time period, means for receiving the sets in alternating sequence from said groups, a memory type cathode ray tube having a fluorescent screen, means for projecting a beam of cathode rays on to said screen and means for deflecting said beam in two coordinate directions, cyclical means connected to said tube and operable at said repetition rate and at a certain scan speed for repeatedly deflecting its beam along one coordinate direction for a certain scan time, scanning means connected to said tube and operable at an arbitrary repetition rate and scan speed many times lower than the first-named repetition rate and scan speed to repeatedly deflect its beam along another coordinate direction for a scan time much greater than the first-named scan time, means for varying the intensity of the beam in accordance with the intensity of the sets of signals received by said receiving means, and means operable in synchronized relation with said scanning means and connected to said tube to erase stored trace intelligence from said screen prior to application of new trace intelligence.

9. Apparatus for simultaneously displaying a progressive, side-by-side pictorial representation of two separate groups of signals, each group comprising successive sets of signals each group having its successive sets occurring at an identical repetition rate that defines a determinable time period wherein each set of each group has an actual time length substantially less than said time period and wherein the total of the time length for any set of one group and the time length for any set of the other group is not greater than said determinable time period, means for receiving the sets in alternating sequence from said groups, first and second memory type cathode ray tubes, each tube having a fluorescent screen, means for each tube for projecting a beam of cathode rays onto its screen, and means for each tube for deflecting its beam in two coordinate directions, cyclical means connected to each tube and operable at said repetition rate and at a certain scan speed for deflecting its beam in one coordinate direction for a certain scan time, scanning means connected to the first tube for deflecting its beam in the other coordinate direction for a scan time many times greater than the first named scan time, scanning means connected to the second tube for deflecting its beam in the other coordinate direction for a scan time many times greater than the first-named scan time, sequencing means actuating said scanning means of said tubes at a repetition rate many times lower than the first-named repetition rate and in an alternating sequence to cause the beam of said first tube to scan its screen during intervals between successive scannings of the screen of the second tube by its beam and correspondingly to cause the beam of said second tube to scan its screen during intervals between successive scannings of the screen of said first tube, means for varying the intensity of each beam in accordance with the intensity of the sets of signals received by said receiving means, means for applying the sets from said groups in alternating time spaced sequence to said varying means, and means synchronized with said sequencing means for applying erase signals in an alternating sequence to said tubes to erase stored trace intelligence from each screen individually and prior to application of new trace intelligence.

10. The method of presenting a composite pictorial representation of the internal structural characteristics of lengthwise successive sections of a track rail comprising cyclically emitting ultrasonic test signals from ultrasonic equipment at a predetermined repetition rate and generating sweep signals at said rate, directing each pulse into the rail along a prescribed path through the rail material to produce a set of echo signals corresponding thereto and representative of elastic discontinuities of the rail material along said path, progressively advancing such equipment lengthwise relative to the rail to produce a separate set of echo signals corresponding to each test signal and each representative of a lengthwise successive section of the rail, receiving each set of echo signals for display on a memory type cathode ray tube having a fluorescent screen, projecting a beam of cathode rays onto said screen and deflecting the beam in two coordinate directions, applying the sweep signals to the deflecting means for deflecting the beam along one coordinate direction, generating scanning signals at an arbitrary repetition rate many times lower than said predetermined repetition rate and having a scan time many times greater than the scan time of the sweep signals and applying the scanning signals to the deflecting means for deflecting the beam along the other coordinate direction, applying the received sets of echo signals to the tube for varying the intensity of the beam in accordance with the intensity of such patterns, generating and applying erase signals to said tube in synchronized relation with said scanning signals to erase stored trace intelligence from said screen prior to application of new trace intelligence and varying the relationship between the relative speed of movement of the ultrasonic equipment to the rail and the said arbitrary repetition rate to regulate the scale of the pictorial representation provided on the screen.

11. Apparatus in accordance with claim 1 and including a joint detector responsive to each rail-joint and bolt-hole region for controlling initiation of the said second means at a time to present successively a longitudinal, cross-sectional, pictorial representation of the internal structural characteristics of the rail at each corresponding rail-joint and bolt-hole region.

12. Apparatus in accordance with claim 11 and including means for presenting on a second fluorescent screen a persistent longitudinal, cross-sectional, pictorial representation of the internal structural characteristics of a typical rail-joint and bolt-hole region, and means for comparing and indicating the match of each successive representation on the first screen with the representation on the second screen.

13. Apparatus for simultaneously displaying a progressive, side-by-side pictorial representation of a pair of track rails and comprising ultrasonic equipment for each rail and each including means operable to emit successive ultrasonic test signal pulses at a corresponding repetition rate that defines a determinable time period and operable for receiving echoes of said pulses, means for simultaneously progressing each ultrasonic equipment along its corresponding rail to successively establish such equipment in elastic wave transmitting and receiving relation with lengthwise successive portions of each rail to enable each ultrasonic equipment to produce a separate set of echo signals, corresponding to each test signal pulse and constituting an A-scan pulse echo signal pattern representative of lengthwise successive sections of its corresponding rail, with the sets of signals separately received by each ultrasonic equipment collectively constituting separate groups of successive sets of echo signals wherein each set of echo signals has an actual time length substantially less than said time period and wherein the total of the time length for any set of echo signals of one group and the time length for any set of echo signals of the other group is not greater than said time period, a memory type cathode ray tube having a fluorescent screen, means for projecting a beam of cathode rays on to said screen and means for deflecting said beam in two coordinate directions, cyclical means connected to said tube and operable at said repetition rate and at a certain scan speed for repeatedly deflecting said beam along one coordinate direction for a certain scan time, scanning means connected to said tube and operable at an arbitrary repetition rate and scan speed many times lower than the first-named repetition rate and scan speed to repeatedly deflect its beam along another coordinate direction, for a scan time much greater than the first named scan time, means for varying the intensity of the beam in accordance with the intensity of the sets of echo signals received by said receiving means, means for applying the sets from said groups in alternating time spaced sequence to said varying means, and means operable in synchronized relation with said scanning means and connected to said tube to erase stored trace intelligence from said screen prior to application of new trace intelligence.

14. Apparatus for simultaneously displaying a progressive, side-by-side pictorial representation of a pair of track rails and comprising ultrasonic equipment for each rail and each including means operable to emit successive ultrasonic test signal pulses at a corresponding repetition rate that defines a determinable time period and operable for receiving echoes of said pulse, means for simultaneously progressing each ultrasonic equipment along its corresponding rail to successively establish such equipment in elastic wave transmitting and receiving relation with lengthwise successive portions of each rail to enable each ultrasonic equipment to produce a separate set of echo signals corresponding to each test signal pulse and constituting an A-scan pulse echo signal pattern representative of lengthwise successive sections of its corresponding rail, with the sets of signals separately received by each ultrasonic equipment collectively constituting separate groups of successive sets of echo signals wherein each set of echo signals of each group has an actual time length substantially less than said time period and wherein the total of the time length for any set of echo signals of one group and the time length for any set of echo signals of the other group is not greater than said time period, first and second memory type cathode ray tubes, each tube having a fluorescent screen, means for each tube for projecting a beam of cathode rays onto its screen, and means for each tube for deflecting its beam in two coordinate directions, cyclical means connected to each tube and operable at said repetition rate and at a certain scan speed for deflecting its beam in one coordinate direction for a certain scan time, scanning means connected to the first tube for deflecting its beam in the other coordinate direction for a scan time many times greater than the first named scan time, scanning means connected to the second tube for deflecting its beam in the other co-ordinate direction for a scan time many times greater than the first named scan time, sequencing means actuating said scanning means of said tubes at a repetition rate many times lower than the first named repetition rate and in an alternating sequence to cause the beam of said first tube to scan its screen during intervals between successive scannings of the screen of the second tube by its beam and correspondingly to cause the beam of said second tube to scan its screen during intervals between successive scannings of the screen of said first tube, means for varying the intensity of each beam in accordance with the intensity of the sets of echo signals received by said receiving means, means for applying the sets from said groups in alternating time spaced sequence to said varying means, and means synchronized with said sequencing means for applying erase signals in an alternating sequence to said tubes to erase stored trace intelligence from each screen individually and prior to application of new trace intelligence.

References Cited in the file of this patent

UNITED STATES PATENTS

| | | |
|---|---|---|
| 2,026,330 | Tauschek | Dec. 31, 1935 |
| 2,561,197 | Goldsmith | July 17, 1951 |
| 2,593,865 | Erdman | Apr. 22, 1952 |
| 2,626,989 | Brown | Jan. 27, 1953 |
| 2,648,723 | Goldsmith | Aug. 11, 1953 |
| 2,699,061 | Drake | Jan. 11, 1955 |
| 2,702,356 | Flory | Feb. 15, 1955 |
| 2,736,193 | Van Valkenburg | Feb. 28, 1956 |
| 2,790,929 | Herman et al. | Apr. 30, 1957 |
| 2,969,671 | Sproule | Jan. 31, 1961 |
| 3,011,339 | Furon | Dec. 5, 1961 |
| 3,023,611 | Howry | Mar. 6, 1962 |